United States Patent Office 3,224,995
Patented Dec. 21, 1965

3,224,995
POLYVINYL CHLORIDE PLASTICIZED WITH DIALKOXYALKYL HOMOTEREPHTHALATES
David O. De Pree, Baton Rouge, La., assignor to Ethyl Corporation, New York, N.Y., a corporation of Virginia
No Drawing. Original application Feb. 16, 1961, Ser. No. 89,677. Divided and this application May 31, 1963, Ser. No. 287,737
4 Claims. (Cl. 260—31.4)

This application is a division of application Serial No. 89,677 filed February 16, 1961, now abandoned.

This invention relates to novel dialkyl and dialkoxyalkyl homoterephthalates and their addition to various resins and polymers as a plasticizer. This invention in particular relates to plastic compositions wherein improved properties are produced by the incorporation into the resins mass of a dialkyl homoterephthalate or a dialkoxyalkyl homoterephthlate. This invention further relates of the use of a novel dialkyl and dialkoxyalkyl homoterephthalates as synthetic lubricants.

In the field of vinyl chloride resins it has been well established that the commercial values of such products are to a large degree directly dependent upon the modifying plasticizer used. The amount of the specific plasticizer used, of course, depends not only on the plasticizer itself but also on the properties required in the finished product, e.g., floor tile, plastic garden hose, shower curtains, raincoats, etc. Regardless of the end use, however, there are certain technical properties which a good plasticizer must possess. These are compatibility, efficiency, permanence, and low temperature flexibility. Over and above these technical properties there are other certain desirable characteristics which a plasticizer should have, such as pleasant odor and unobjectionable color. Furthermore, the plasticizer should not have the objectionable feature goes toxicity, while at the same time it should be fairly mildew and fungus resistant. In addition to all of these properties the plasticizer should be inexpensive.

In the last few years new developments in aircraft and guided missile fields have created applications for lubricants and instrument oils which cannot be met by the conventional petroleum based lubricants, even when these are improved by the best additives known. New types of turbo jet and turbo prop transport aircraft must fly at high altitudes and at high engine operating temperatures. The lubricants, hydraulic fluids and instrument oils used in these planes must therefore function at temperatures as low as —100° F. to as high as 350° F. The best available petroleum lubricants are too viscous at these low temperatures and are decomposed at the high temperatures. It has therefore been necessary to develop for these applications wholly synthetic lubricants which meet the rigid standards set forth hereinabove.

Accordingly, it is an object of this invention to provide a new class of plasticizers. It is a further object to provide new compounds which possess the numerous properties of good plasticizers. It is still a further object to provide new compounds which can be used as synthetic lubricants. Another object is to provide plasticized compositions and plasticizing methods, especially those involving polyvinyl chloride. Other objects will become more apparent from the following discussion and appended claims.

It is now found that these and other objects are accomplished by the provision of esters of homoterephthalic acid having the formula

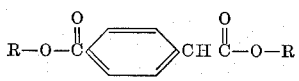

wherein R is an alkyl or alkoxyalkyl group having from 4 to about 24 carbon atoms. Preferred compounds of this invention are those in which said groups contain from about 6 to about 18 carbon atoms. These compounds are preferred because of their excellent balance of compatibility, permanence and efficiency as plasticizers. The most particularly preferred compounds of this invention are di-n-octyl homoterephthalate, di-2-ethylhexyl homoterephthalate, and dibutoxyethyl homoterephthalate. These compounds are most particularly preferred because they possess an optimum ratio of solubilizing groups, i.e., ester groups, to the total molecular weight of the respective compounds. Hence these particular compounds have especially excellent plasticizer properties.

Another embodiment of this invention is the use as synthetic lubricants of the esters of homoterephthalic acid as described above wherein each alkyl or alkoxyalkyl group contains from 4 to 18 carbon atoms. The most preferred compounds are those in which the alkyl or alkoxyalkyl group contains from about 6 to about 12 carbon atoms. The compounds containing this number of carbon atoms are preferred because of the optimum low temperature viscosity properties which they possess. The most particularly preferred compounds of this embodiment are di-2-ethylhexyl homoterephthalate and diehexyl homoterephthalate. These compounds are most preferred because of their high temperature stability and ideal low temperature viscosity characteristics as well as their splendid lubricating ability.

Another embodiment of this invention is polyvinyl chloride and other similar resins containing a dialkyl homoterephthalate or a dialkoxyalkyl homoterephthalate as described above in an amount ranging from about 10 to about 80 weight percent of the ester sufficient to plasticize the polyvinyl chloride. Mixtures of dialkyl homoterephthalates and dialkoxyalkyl homoterephthalates may also be used in polyvinyl chloride and related resins to impart excellent plasticizing properties thereon.

A further embodiment of this invention is the process of plasticizing polyvinyl chloride and related resins, wherein a dialkyl homoterephthalate or dialkoxyalkyl homoterephthalate, as described above, is mixed with polyvinyl chloride. This process may be accomplished under the application of heat, e.g., at a temperature of from about 20° C. to about 300° C. The amount of heat used depends on the type of process used to plasticize the resin, i.e., dry blend or roll mill and the like. The amount of the ester used in this process ranges from about 10 to about 80 weight percent of the polyvinyl chloride used.

Typical examples of the compounds of this invention are di-n-butyl homoterephthalate, diisobutyl homoterephthalate, di-n-hexyl homoterephthalate, diisohexyl homoterephthalate, di-2-methylhexyl homoterephthalate, di-3-ethylhexyl homoterephthalate, di-2-ethyloctyl homoterephthalate, di-2-methyloctyl homoterephthalate, di-3-ethyloctyl homoterephthalate, di-3-propyldecyl homoterephthalate, di-2-methyl-β-ethyloctyl homoterephthalate, di-n-decyl homoterephthalate, di-2-methyldecyl homoterephthalate, di-3-methyldecyl homoterephthalate, di-3-ethyldecyl homoterephthalate, di-n-undecyl homoterephthalate, di-2-propyl undecyl homoterephthalate, di-n-tridecyl homoterephthalate, di-4-ethyl tridecyl homoterephthalate, di-3-methyl hexadecyl homoterephthalate, di-8-hexadecyl homoterephthalate, di-n-heptadecyl homoterephthalate, di-3-butyl octadecyl homoterephthalate, di-n-eicosyl homoterephthalate, di-n-heneicosyl homoterephthalate, di-n-trieicosyl homoterephthalate, di-10-pentyl tetraeicosyl homoterephthalate, and the like.

Typical examples of mixed esters of homoterephthalic acid are octyl alpha-hexyl homoterephthalate (i.e., the hexyl ester of the carboxylic group is attached to the alpha-carbon atom which forms the methylene bridge which in turn is bonded to the ring whereas the octyl group is bonded to the other carboxyl group), 2-ethylhexyl alpha-octyl homoterephthalate, octyl alpha-decyl homoterephthalate, 3-ethyldecyl alpha-octyl homoterephthalate, and the like.

Typical examples of alkoxyalkyl homoterephthalates are di-2-ethoxyethyl homoterephthalate, di-2-methoxyethyl homoterephthalate, di-4-methoxybutyl homoterephthalate, di-8-butoxyoctyl homoterephthalate, and the like.

The compounds of this invention are generally produced by esterification of homoterephthalic acid with an appropriate alcohol. This reaction may or may not take place in the presence of a catalyst and usually at the reflux temperature of the system.

The catalysts generally used in the reaction of this type are acid catalysts such as p-toluene sulfonic acid, anhydrous hydrogen chloride, sulfuric acid, and the like. These acid catalysts when employed can be used in an amount of from about 1 percent to 50 percent by weight based on the acid being esterified. The preferred range, however, is from about 2 percent to about 5 percent based on the weight of said acid. The temperature at which the reaction is run is usually at the reflux temperature of the system except when the boiling point of the alcohol is over about 180° C.

When such a high boiling alcohol is present, an azeotropic hydrocarbon solvent would generally be employed to prevent undesirable side reactions of the alcohol at the extremely high temperatures which would otherwise be required. Solvents generally employed are toluene, benzene, aromatic naphthas, and the like. The ratio of reactants used in this esterification reaction ranges from 1.1:1 to 30:1 (mole ratio of alcohol to acid). The preferred ratio is 2:1 to 5:1 since this gives the best yields with the least difficulty of product separation and isolation. The reaction time is usually from about 4 to about 18 hours.

Another process by which the compounds of this invention may be produced is by the ester interchange method comprising reacting a given ester of homoterephthalate acid with an alcohol containing the desired ester function. In this way the original ester groups are replaced by the desired ester functions. In this method the reaction conditions are essentially as described above.

The methods by which the compounds of this invention are produced can be further understood by the following examples. All quantities and percentages are by weight unless otherwise designated.

EXAMPLE I

Homoterephthalic acid (54 parts) was reacted with 117 parts of n-octanol using 3 parts of p-toluene sulfonic acid as a catalyst with 600 parts by volume of toluene as a solvent. The mixture was heated to reflux temperature and the water formed on esterification was removed as the azeotrope with toluene. When no more water was removed (after 16 hours of refluxing) the mass was cooled and washed with saturated brine to remove the catalyst. The mixture was then dried over anhydrous $CaCl_2$. The mixture was then vacuum distilled. The fraction boiling from 213–219° C. at 0.4 mm. mercury was collected and found to be di-n-octyl homoterephthalate, a colorless liquid (77 percent yield).

EXAMPLE II

A round bottomed flask was charged with 112 parts of dimethyl homoterephthalate, 140 parts of purified 2-ethylhexanol, and 2.3 parts of p-toluene sulfonic acid monohydrate. The mixture was heated for 3 hours and 40–42 parts by volume of methanol were recovered through a distilling column attached to the flask. The residue in the flask was dissolved in xylene, washed with NaOH and water, and dried by filtration through anhydrous $Na_2SO_4$. Distillation at 0.2 mm. Hg gave 120 parts by volume (58.5 percent yield) of colorless liquid, boiling at 194–195° C., which was identified as di-2-ethylhexyl homoterephthalate.

EXAMPLE III

Dimethyl homoterephthalate (21 parts), n-octadecanol (81 parts) and p-toluene sulfonic acid (2 parts) were charged to a flask provided with distillation take off for removal of methanol and heated to reflux. The product was taken up in toluene and washed with water to remove the catalyst and then dried over magnesium sulfate. It was then vacuum distilled at 170° C. to remove the octadecanol, the product remaining in the pot. This was then dissolved in 400 parts by volume of benzene and passed through a silica gel column using benzene as wash. The product remaining on the column was washed off with methanol. This was found by chemical analysis to be octadecanol. The ester was recovered from the benzene solution by distilling off the benzene. The dioctadecyl homoterephthalate, a white solid melting at 56° C., was thereupon recovered in 70 percent yield.

EXAMPLE IV

Dimethyl homoterephthalate (21 parts), n-butyl alcohol (80 parts), and p-toluene sulfonic acid (2 parts) were placed in a flask provided with Vigreux column and take-off head and heated to the reflux temperature of the system for a period of 5 hours. The reaction mass was washed with water to remove the acid. The oily layer was then separated and dried by the use of magnesium sulfate. This fraction was filtered and fractionated. The fraction boiling between 191° to 200° C. at 4 mm. Hg was recovered and identified by chemical analysis as di-n-butyl homoterephthalate, a colorless liquid. The product was produced in 91.5 percent yield.

EXAMPLE V

Dimethyl homoterephthalate (2 parts), 2-butoxy ethanol (6 parts), and 2 parts of p-toluene sulfonic acid are placed in a flask fitted with a reflux condenser and heated for 6 hours at the reflux temperature of the system. The methanol is removed and the residue in the flask is dissolved in xylene, washed with aqueous sodium hydroxide and with water. The residue is dried by filtration through anhydrous $Na_2SO_4$. Distillation at 0.5 mm. Hg gives a good yield of dibutoxyethyl homoterphthalate.

EXAMPLE VI

Dimethyl homoterephthalate (23 parts), hexanol (90 parts) and 2 parts of p-toluene sulfonic acid are placed in a flask fitted with a reflux condenser and heated for 5 hours at the reflux temperature of the system. The methanol is removed and the residue in the flask is dissolved in xylene, washed with aqueous sodium hydroxide solution and then with water. The residue is dried by filtration through anhydrous Na₂SO₄. Distillation at 0.4 mg. Hg gives a good yield of dihexyl homoterephthalate.

The methods of preparing these and the other esters of this invention will now be apparent to those skilled in the art.

This invention is predicated in part on the discovery that each alkyl or alkoxyalkyl group on the ester must have 4 or more carbon atoms. For example, this structure confers upon the present compounds the characteristics of an excellent plasticizer. On the other hand, where alkyls or alkoxyalkyls have less than 4 carbons each, the compounds are worthless as plasticizers. To illustrate, di-2-ethylhexyl homoterphthalate, a compound of this invention, was tested and compared with dimethyl homoterephthalate for purposes of evaluation as a plasticizer. Di-2-ethylhexyl homoterephthalate was found to have excellent properties whereas the dimethyl homoterephthalate was found to have extremely poor properties, the test criteria used being weight loss during milling, tensile modulus at 100 percent elongation, ultimate tensile strength utlimate elongation.

In particular, each of the esters was compounded with polyvinyl chloride on a steam bath for 5 minutes until a mix approaching a dry blend was obtained. The mix was then poured on an equal speed 2-roll mill and milled at 310° F. for 7 minutes. Plasticized polyvinyl chloride sheets were obtained and were tested under accelerated aging tests by weighing the newly milled plastics and then immersing them in a Barnaby-Cheney activated carbon for 42 hours at 80° C. The plastic specimens were then removed from the activated carbon, reweighed and tested for tensile modulus at 100 percent elongation and for ultimate tensile strength. Ultimate tensile strength is the force required to break the sample by stretching it and is measured in pounds per square inch. Tensile modulus at 100 percent elongation is the measure of force of pull at this degree of extension. The tensile tests were conducted on an Instron machine, clamping distance 2½″, machine speed 20″ per minute, and gauge length of 1″. The tests were performed at 73° F. at 50 percent relative humidity. The results of the tests are set out in Tables I and II. Table I shows the averages of the 4 tests that were completed on each batch of the plasticized polyvinyl chloride.

The results of an additional series of tests are shown in Table II.

TABLE II.—EFFECT OF CHEMICAL STRUCTURE ON PLASTICIZER PERFORMANCE

Dimethyl Homoterephthalate

| Charged, p.h.r. | Found after milling,[1] p.h.r. | Loss during milling, percent | Tensile modulus at 100% elongation, p.s.i. | Ultimate elongation, percent |
|---|---|---|---|---|
| 60 | 41.0 | 31.7 | 1,715 | 250 |
| 45 | 31.7 | 29.6 | 3,120 | 200 |

Di-2-Ethylhexyl Homoterephthalate

| 50.2 | 50.2 | 0 | 1,515 | 270 |
| 44.0 | ------ | ------ | 2,240 | 225 |

[1] 2 g. sheet dissolved in THF, PVC precipitated with methanol filtered off and dried in vacuum oven. Weight difference is plasticizer plus stabilizer.
P.h.r.=Parts per hundred parts (concentration).

As can be seen by the results in Table II, the dimethyl homoterephthalate does not have the permanence required for a good plasticizer. For instance, 60 parts of ester per 100 parts of polyvinyl chloride were mixed and milled after which the amount of the plasticizer present in the resin was measured. There was found to be a loss of up to 31.7 percent of the dimethyl homoterephthalate plasticizer during the milling process. However, when the di-2-ethylhexyl homoterephthalate was added to the polyvinyl chloride and milled and then the amount of the remaining 2-ethylhexyl ester measured, there was found to be no detectable loss during the milling process. In other words, this ester had total permanence under the test conditions. The tensile modulus of the finished products was measured to determine the plasticizer efficiency. Plasticizer efficiency can be defined as the amount of plasticizer required to produce a standard flexibility (standard modulus at 100 percent elongation). Tensile modulus at 100 percent elongation, expressed in pounds per square inch, is a measure of the amount of force required to stretch the sample plastic to 100 percent elongation. As seen in Table II, 60 parts of dimethyl

TABLE I.—EFFECT OF ACCELERATED AGING ON TENSILE PROPERTIES

| Plasticizer, p.h.r.[1] | At 100% elongation | | | Weight loss on aging, percent |
| | Tensile modulus, p.s.i. | Tensile modulus after aging,[2] p.s.i. | Change on aging, percent | |
|---|---|---|---|---|
| 50.2—Di-2-ethylhexyl homoterephthalate | 1,515 | 1,700 | 12.2 | 0.43 |
| 41—Dimethyl homoterephthalate | 1,720 | 2,735 | 59 | 6.7 |

[1] Parts per hundred parts of polyvinyl chloride.
[2] Immersed in Barnaby-Cheney activated carbon 42 hours at 80° C.

It is readily seen in Table I that the di-2-ethylhexyl homoterephthalate plastic withstood aging much better than the plastic containing dimethyl homoterephthalate. The change upon aging is measured by the tensile modulus at 100 percent elongation before aging the plastic in the Barnaby-Cheney activated carbon and then measuring the tensile modulus after aging at 100 percent elongation. It is seen that the tensile modulus after aging (the lower the number the better the plasticization) for the di-2-ethylhexyl homoterephthalate system was only 12.2 percent. In sharp contrast, to this, the net change of tensile modulus of the dimethyl homoterephthalate plastic was 59 percent. It is also readily seen in Table I that the dimethyl homoterephthalate plastic had a 6.7 percent weight loss upon aging whereas the di-2-ethylhexyl homoterephthalate had only a 0.43 percent weight loss.

homoterephthalate per 100 parts of the resin gave a plastic with a modulus of 1,715 pounds per square inch at 100 percent elongation whereas with only 50 parts (per 100) of di-2-ethylhexyl homoterephthalate, the resultant resin had a modulus of 1,515 pounds per square inch at 100 percent elongation. In other words, in this instance, the larger the number, the less efficient the plasticizer. It is readily seen therefore that it requires less di-2-ethylhexyl homoterephthalate to plasticize polyvinyl chloride than it does when attempting to use dimethyl homoterephthalate. Furthermore, the ultimate elongation of the samples tested demonstrated that the di-2-ethylhexyl homoterephthalate plasticized polyvinyl chloride showed higher ultimate elongation than the dimethyl homoterephthalate plasticized polyvinyl chloride. (In this case, the higher the number the more flexible the plastic.)

Thus, it is readily seen that di-2-ethylhexyl homoterephthalate is a much superior plasticizer than is dimethyl homoterephthalate.

The value of the compounds of the present invention is even more dramatically illustrated by the tests conducted using di-n-octyl homoterephthalate as a plasticizer. For comparative purposes, companion tests were run using dioctyl phthalate, a widely-used commercial plasticizer. Tensile strength at 100 percent elongation, ultimate tensile and ultimate elongation of the test samples were determined in the same manner as described above. Over and above this, standard ASTM low temperature brittle tests were conducted on these plasticized polyvinyl chloride specimens. The results of the tests are presented in Table III.

TABLE III.—EFFECT OF PLASTICIZER CONTENT ON PLASTICIZED PVC PROPERTIES

| Plasticizer | P.h.r.[1] | Tensile [2] 100% elong., p.s.i. | Ultimate elongation | Temp. of [3] 50% brittle failure, °F.* |
|---|---|---|---|---|
| Dioctyl phthalate | 45 | 1,920±60 | 230 |  |
|  | *52 | 1,440±25 | 240 | −24 |
| Di-n-octyl homoterephthalate | 50 | 1,600±90 | 270 | −50 |
|  | *52 | 1,400±30 | 280 | −52 |

*Approx. standard modulus (1,500 p.s.i. at 100% elongation) plasticizer content.
[1] P.h.r. = Parts/100 resin.
[2] Standard Test ASTM D412, 20"/min., 73 F, 50% RH, average of 3 specimens.
[3] Standard Test ASTM D746-51.

As can be readily observed by the results in Table III, di-n-octyl homoterephthalate, a compound of this invention, is a very superior plasticizer. The tensile modulus at 100 percent elongation in Table III demonstrates that the di-n-octyl homoterephthalate requires less force to stretch it, thus it is more flexible (the lower the number the more efficient the plasticizer). As has been stated hereinbefore, plasticizer efficiency is measured by the amount of plasticizer required to produce a standard flexibility. The ultimate elongation of the di-n-octyl homoterephthalate is also superior to the dioctyl phthalate (the higher the number the more flexible the product, thus the better the plasticizer).

The brittle failure temperature was demonstrated by carrying out the test according to ASTM D746-51. Samples were prepared by cutting ¼" wide strips of the plastic to be tested. Several strips were clamped in a clamping device and immersed 3 minutes in a methanol Dry Ice mixture at the temperature desired. The strips were then removed and subjected immediately to impact from a pendulum device. The temperature is progressively lowered until a temperature is found at which 50 percent of the specimens break or crack when subjected to impact. Hence, the lower the temperature, the more efficient is the plasticizer. In fact, in actual practice it is desirable to have a brittle failure temperature as low as −50° F. As has been pointed out in Table III, dioctyl phthalate has a brittle temperature of −24° F. In sharp contrast to this poor result, di-n-octyl homoterephthalate, a compound of this invention, can be exposed to temperatures as low as −52° F. before 50 percent brittle failure occurs.

In summary, therefore, the foregoing tests established that the presence of esters of this invention in polyvinyl chloride gave a superior balance of tensile strength, elongation, low temperature flexibility, permanence, and low migration tendency.

Over and above these excellent features exhibited by the di-n-octyl homoterephthalate, the compound was also found to be a compatible plasticizer for not only polyvinyl chloride, but for vinyl chloride-vinyl acetate copolymer, polyvinyl butyral, cellulose acetate-cellulose butyrate, cellulose nitrate, ethyl cellulose, chlorinated rubber, and gum shellac. Hence, this invention extends to the incorporation of plasticizing quantities of from about 10 to about 80 weight percent of the compound of this invention in various plastics, such as those just described.

The plasticizing of various polymers such as polyvinyl chloride can also be accomplished by the use of mixed esters of homoterephthalic acid. The mixed esters such as butyl-α-2-ethylhexyl homoterephthalate possess a balance of features such as compatibility, low volatility, low temperature flexibility, and the like. Accordingly, these mixed esters are oftentimes ideally suited for special applications where these properties are of utmost importance. Similarly mixtures of esters of homoterephthalic acid such as di-n-butyl homoterephthalate and di-n-octyl homoterephalate; di-2-ethoxyethyl homoterephthalate and di-n-decyl homoterephthalate; and diisohexyl homoterephthtalate, di-3-methyldecyl homoterephthalate and di-4-methoxybutyl homoterephthalate; and the like may be used to plasticize various resins such as polyvinyl chloride to impart to the end product such superior properties as flexibility, permanence, strength, and the like.

The compounds of this invention may also be used in conjunction with previously known plasticizers such as di-n-octyl sebacate, di-2-ethylhexyl sebacate, dibutyl sebacate, dibutyl adipate, tricresyl phosphate, dibutyl phthalate, di-n-octyl phthalate, diisooctyl phthalate, diamyl phthalate, octyl oleate, octyl stearate, triphenyl phosphate, and the like. A particular advantage of these mixtures is that in many cases they impart upon the resin a synergistic effect insofar as plasticizing effectiveness is concerned. Moreover, a number of these mixtures results in markedly improved resin products such as resin products possessing improved clarity (low fish eye count), good heat stability, low migration, low volatility, superior strength, and the like. Normally when such mixtures are prepared the proportion of heretofore known plasticizer to a compound of this invention will range from about 10 to about 90 weight percent. The resulting mixture of plasticizers can be used to plasticize polyvinyl chloride or other similar resins in an amount ranging from about 10 to about 80 weight percent (plasticizer to resin). This permits one to create a tailor-made plasticizer designed specifically for the end use of the plastic product.

The alkyl and alkoxyalkyl esters of homoterephthalic acid have also proved to be excellent when used as synthetic lubricants. For example, these compounds have superior thermal stability up to 600° F. As a matter of fact, tests have shown that no significant oxidative deterioration of the lubricant occurred even under these high temperature conditions. For example, when di-2-ethylhexyl homoterephthalate, a particularly preferred compound of this invention, was tested as a synthetic lubricant and compared to di-2-ethylhexyl sebacate, a standard commercial synthetic lubricant, the homoterephthalate ester was found to have superior properties. One particular comparative test run on these two compounds was the Panel-Coker test for high temperature evaluation and oxidation stability. This test is described in the Aeronautical Standards group of the Departments of Navy and Air Force Specifications MIL–L–7808C dated November 2, 1955. The test was conducted at 600° F. for a period of 4½ hours. At the end of this time the test panel in contact with the di-2-ethylhexyl homoterephthalate had shown a weight gain of only 11 milligrams as compared to the weight gains of 72 and 66 milligrams for the di-2-ethylhexyl sebacate test panels. Furthermore, upon examining the test oils themselves upon completion of the tests, it was found that the di-2-ethylhexyl sebacate had undergone deterioration since it contained a dark brown gummy residue. However, the di-2-ethylhexyl homoterephthalate was still a water clear liquid containing essentially no residue. Moreover, its lubricating properties were unimpaired. This dramatically points out that the di-2-ethylhexyl homoterephthalate, a compound of this invention, exhibits far superior thermal stability and oxidative stability properties than does the commercial sebacate ester. These superior properties render the homoterephthalate ester even more useful as a synthetic lubricant than the sebacate ester.

Besides obtaining very effective lubrication by using the esters of homoterephthalic acid per se to lubricate relatively-moving, contacting metallic surfaces, excellent lubrication is also achieved when these esters are used in conjunction with known lubricants. Thus, the synthetic lubricants of this invention comprise the above defined esters, which may be used in combination with one or more standard lubricants, such as mineral lubricating oils, synthetic ester lubricants, silicones, chlordiphenyl oils, and the like. Typical examples of synthetic ester lubricants with which the compounds of this invention can be successfully used are diethyl oxalate, di-sec-butyl malonate, di-(2-hexyl)succinate, di-(isoheptyl)pimelate, di-(3-decyl)suberate, di-sec-amyl glutarate, di-(isobutyl) glutarate, di-(2-ethylbutyl)glutarate, di-sec-amyl adipate, di-(3-methylbutyl)adipate, diethyl adipate, di-(4-propyl cyclohexyl)adipate, di-2-ethylhexyl adipate, di-sec-amyl azelate, di-(isobutyl)azelate, di-(2-ethylbutyl)azelate, di-(ethylhexyl)azelate, di-sec-amyl sebacate, di-sec-butyl sebacate, di - (2 - ethylhexyl)sebacate, bis - (1 - methyl-1-cyclohexyl)sebacate, the glutarates, adipates, azelates and sebacates of branched chain secondary alcohols such as undecanol, tetradecanol, etc.; the butyl, pentyl, hexyl, heptyl, octyl, nonyl, decyl, undecyl, and dodecyl esters of polyol such as pentaerythritol, trimethylol propane, trimethylol ethane, etc.; and other esters of the type described in the literature as useful for synthetic lubricants. Generally speaking, the compounds of this invention will be present in the finished lubricant to a concentration ranging from about 5 to about 95 percent by weight, the balance being one or more previously-known lubricants.

As further examples of this invention use is made of the standard Lauson engine test. According to this test, a standard spark-ignition internal combustion engine is operated for 25 hours using a standard fuel. The engine is examined before and after the test and merit ratings as to varnish formation are given according to the test standards. The rating scale involves numbers from 0 to 10, 0 being a perfect rating. Thus, this test very effectively evaluates the usefulness of the engine lubricant subjected to the test. As a base line, the engine is operated using an oily-refined mineral lubricating oil having a viscosity of 60 Saybolt Universal seconds at 210° F. as a lubricant. The test is then repeated a number of times, in each test using, being made of one of the following esters of homoterephthalic acid as a lubricant—di-n-octyl homoterephthalate; di-2-ethylhexyl homoterephthalate; di-butoxy ethyl homoterephthalate; diisohexyl homoterephthalate; di-n-hexyl homoterephthalate; di-2-methylhexyl homoterephthalate; di-3-ethylhexyl homoterephthalate; di-2-ethyloctyl homoterephthalate; di-2-methyloctyl homoterephthalate; di-n-decyl homoterephthalate; di-2-methyldecyl homoterephthalate; di-2-ethoxyethyl homoterephthalate; di-2-methoxypentyl homoterephthalate; di-4-methoxybutyl homoterephthalate; and octyl-α-hexyl homoterephthalate. In each instance, the use of these esters results in superior merit ratings as compared with the base line rating.

Typical lubricant formulations provided by this invention are given in the following examples in which all percentages are by weight.

EXAMPLE VII

A lubricant is formulated to contain 10 percent of di-(2-ethylhexyl)sebacate and 90 percent di-2-ethylhexyl homoterephthalate.

EXAMPLE VIII

A lubricant is formed from 15 percent of di-n-octyl sebacate, 5 percent tricresyl phosphate, 1 percent phenothiazine, with 79 percent di-n-hexyl homoterephthalate.

EXAMPLE IX

A lubricant is formulated to contain 3 percent tricresyl phosphate, 7 percent dioctyl phthalate, 10 percent highly refined mineral lubricating oil having a viscosity of 60 Saybolt Universal seconds at 210° F. and 80 percent of di-n-octyl homoterephthalate.

EXAMPLE X

A lubricant is made from 50 percent highly refined mineral oil having a viscosity of 60 Saybolt Universal seconds at 210° F. and 50 percent dibutoxy ethyl homoterephthalate.

EXAMPLE XI

A lubricant is made from 30 percent tricresyl phosphate, 30 percent dibutoxy ethyl homoterephthalate and 40 percent di-2-ethylhexyl homoterephthalate.

EXAMPLE XII

A lubricant is formulated to contain 20 percent pentaerythritol and 80 percent diisohexyl homoterephthalate.

When the esters of homoterephthalic acid are used as lubricants, effective use can be made of other additives which are known to the art, such as other inhibitors, detergents-depressants, pour point depressants, viscosity index improvers, anti-foam agents, rust inhibitors, oiliness of film strength agents, dyes and the like. Of the inhibitors which can be effectively used with the present additive combinations are sulfurized sperm oil, sulfurized terpenes, sulfurized paraffin wax olefins, aromatic sulfides, alkyl phenol sulfides, lecithin, neutralized dithiophosphates, phosphorous pentasulfide-terpene reaction products, diphenyl amine, phenyl naphthyl amine, 4,4'-methylenebis(2,6 - di - tert - butylphenol), N - (3,5 - di-tert-butyl-4-hydroxybenzyl), N,N-dimethyl amine, and the like. Typical of the detergent additives that can be used in the compositions of this invention are metallic soaps of high molecular weight acids such as aluminum naphthenates, calcium phenol stearates, calcium alkyl salicylates, alkaline earth metal petroleum sulfonates, alkaline earth metal alkyl phenol sulfides (barium ethyl phenol sulfide, calcium octyl phenol, phenol disulfide, etc.), metal salts of wax substituted phenol derivatives, and the like. Of the viscosity index improvers and pour point depressants effective use can be made of polymers of the esters of methacrylic acids, higher fatty alcohols and the corresponding polymeric esters of acrylic acids and higher fatty alcohols. Other very useful viscosity index improvers are the polyisobutylenes and polyvinyl ethers. These and other additives which can be employed in the compositions of this invention and the concentrations and proportions thereof will now be well known to those skilled in the art.

The compounds of this invention can also be put to many other uses such as insect repellants; alcohol denaturants; ingredients in such materials as emulsion paints, smokeless gun powder; and the like.

Having thus described the compositions of matter and their uses it is not intended that this invention be limited except as set forth in the following claims.

What is claimed is:

1. As a new composition of matter, polyvinyl chloride containing as a plasticizer therefor a dialkoxyalkyl homoterephthalate in which each alkoxyalkyl group contains from 4 to about 24 carbon atoms.

2. The composition of claim 1 wherein said homoterephthalate is dibutoxyethyl homoterephthalate.

3. Polyvinyl chloride containing from about 10 to about 80 weight percent of a dialkoxyalkyl homoterephthalate in which each alkoxyalkyl group contains from 4 to about 24 carbon atoms.

4. The composition of claim 3 wherein said homoterephthalate is dibutoxyethyl homoterephthalate.

References Cited by the Examiner
UNITED STATES PATENTS

| | | | |
|---|---|---|---|
| 2,339,373 | 1/1944 | Bruson | 260—475 |
| 2,628,207 | 2/1953 | Smith et al. | 260—475 |
| 2,642,457 | 6/1953 | Emerson et al. | 260—475 |

MORRIS LIEBMAN, *Primary Examiner.*